Sept. 19, 1961 L. J. MISURACA 3,000,258
PHOTOGRAPHIC SLIDE PROJECTOR
Original Filed Sept. 29, 1954 17 Sheets-Sheet 2

INVENTOR
LOUIS J. MISURACA
BY

*Strauch, Nolan & Neale*
ATTORNEYS

INVENTOR
LOUIS J. MISURACA
BY
ATTORNEYS

Sept. 19, 1961 L. J. MISURACA 3,000,258
PHOTOGRAPHIC SLIDE PROJECTOR
Original Filed Sept. 29, 1954 17 Sheets-Sheet 4

INVENTOR
LOUIS J. MISURACA
BY
*Strauch, Nolan + Neale*
ATTORNEYS

Sept. 19, 1961    L. J. MISURACA    3,000,258
PHOTOGRAPHIC SLIDE PROJECTOR
Original Filed Sept. 29, 1954    17 Sheets-Sheet 5
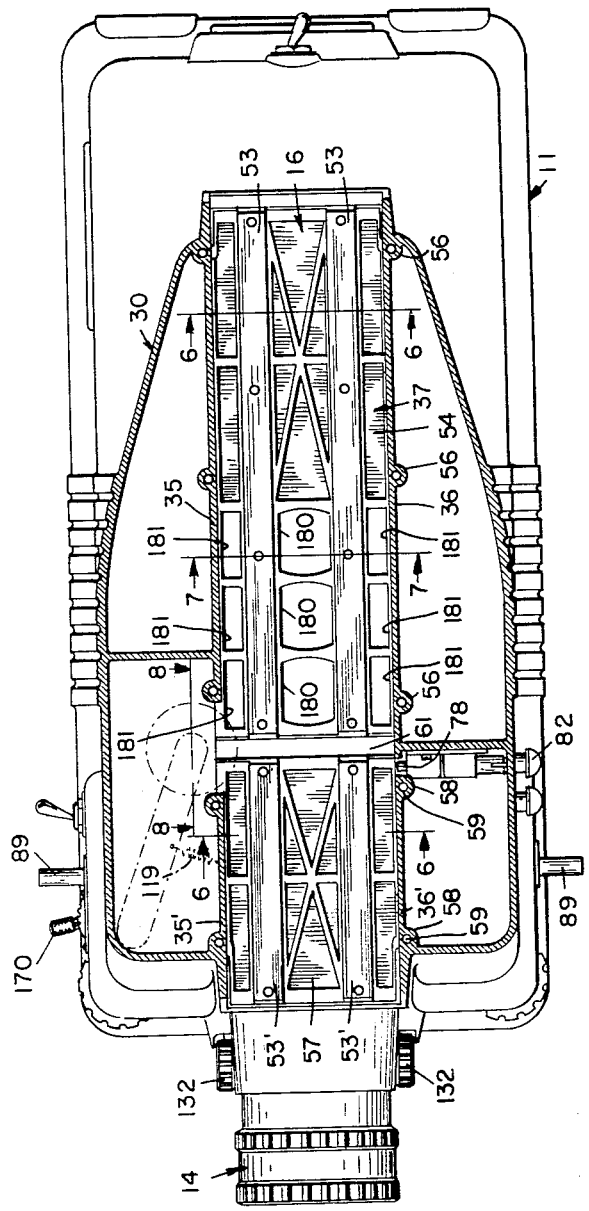
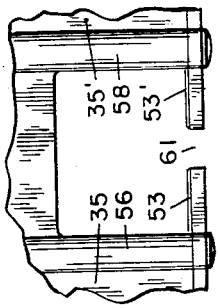
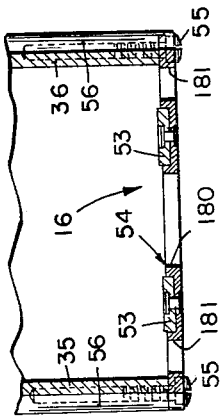
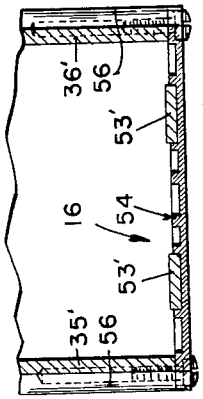
INVENTOR
LOUIS J. MISURACA
BY
ATTORNEYS Sept. 19, 1961     L. J. MISURACA     3,000,258
PHOTOGRAPHIC SLIDE PROJECTOR
Original Filed Sept. 29, 1954     17 Sheets-Sheet 6
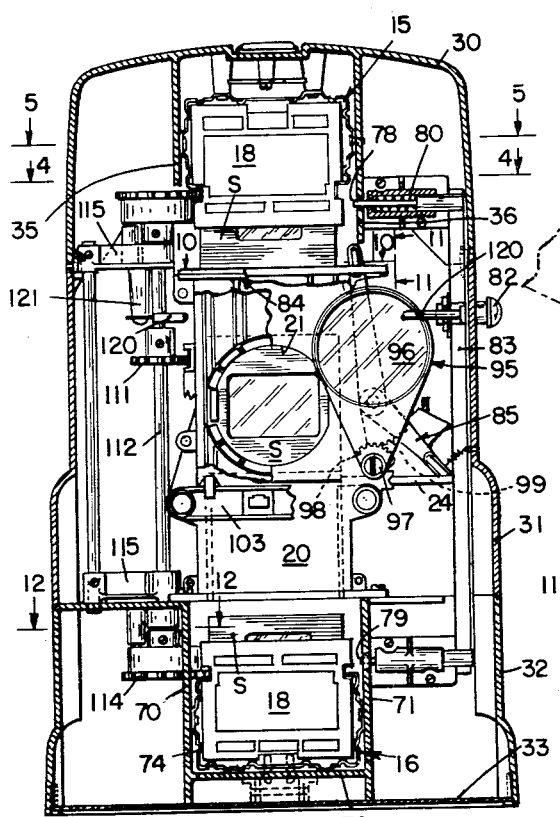
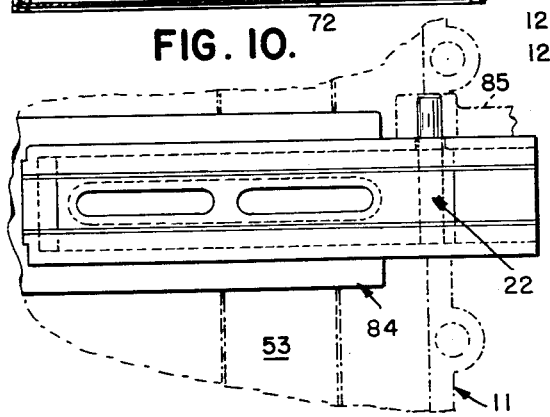
INVENTOR
LOUIS J. MISURACA
BY
*Strauch, Nolan & Neale*
ATTORNEYS Sept. 19, 1961 L. J. MISURACA 3,000,258
PHOTOGRAPHIC SLIDE PROJECTOR
Original Filed Sept. 29, 1954 17 Sheets-Sheet 7

INVENTOR
LOUIS J. MISURACA
BY
*Strauch, Nolan + Neale*
ATTORNEYS

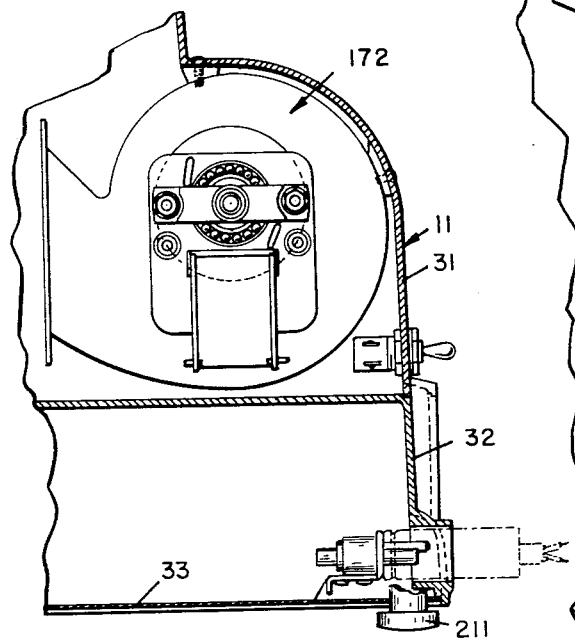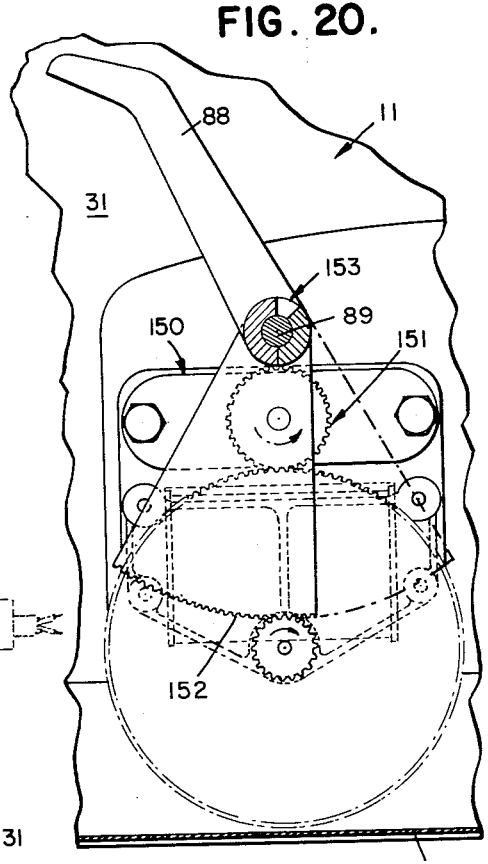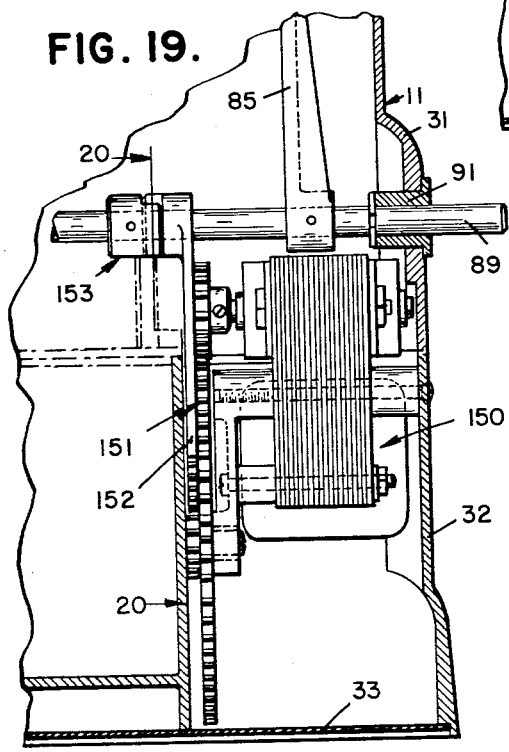

Sept. 19, 1961 L. J. MISURACA 3,000,258
PHOTOGRAPHIC SLIDE PROJECTOR
Original Filed Sept. 29, 1954 17 Sheets-Sheet 9

INVENTOR
LOUIS J. MISURACA
BY
*Strauch, Nolan & Neale*
ATTORNEYS

Sept. 19, 1961     L. J. MISURACA     3,000,258
PHOTOGRAPHIC SLIDE PROJECTOR
Original Filed Sept. 29, 1954     17 Sheets-Sheet 10

INVENTOR
LOUIS J. MISURACA
BY
*Strauch, Nolan + Neale*
ATTORNEYS

Sept. 19, 1961 L. J. MISURACA 3,000,258
PHOTOGRAPHIC SLIDE PROJECTOR
Original Filed Sept. 29, 1954 17 Sheets-Sheet 11

INVENTOR
LOUIS J. MISURACA
BY
*Strauch, Nolan & Neale*
ATTORNEYS

Sept. 19, 1961 L. J. MISURACA 3,000,258
PHOTOGRAPHIC SLIDE PROJECTOR
Original Filed Sept. 29, 1954 17 Sheets-Sheet 12
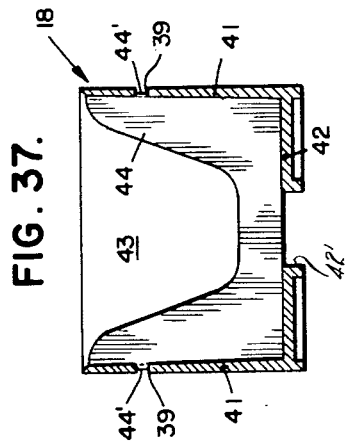
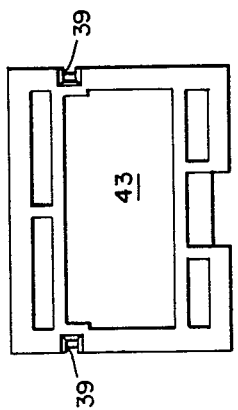
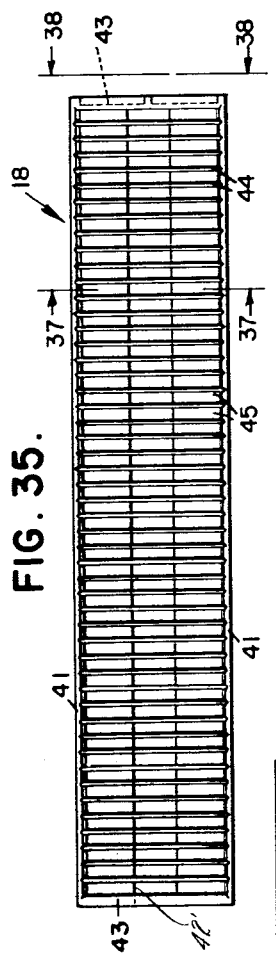
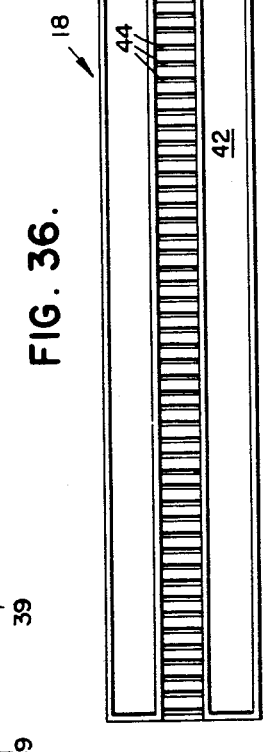
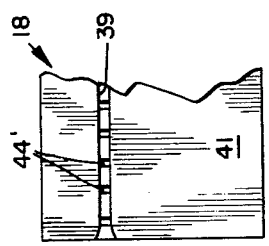
INVENTOR
LOUIS J. MISURACA
BY
ATTORNEYS Sept. 19, 1961 L. J. MISURACA 3,000,258
PHOTOGRAPHIC SLIDE PROJECTOR
Original Filed Sept. 29, 1954 17 Sheets-Sheet 13
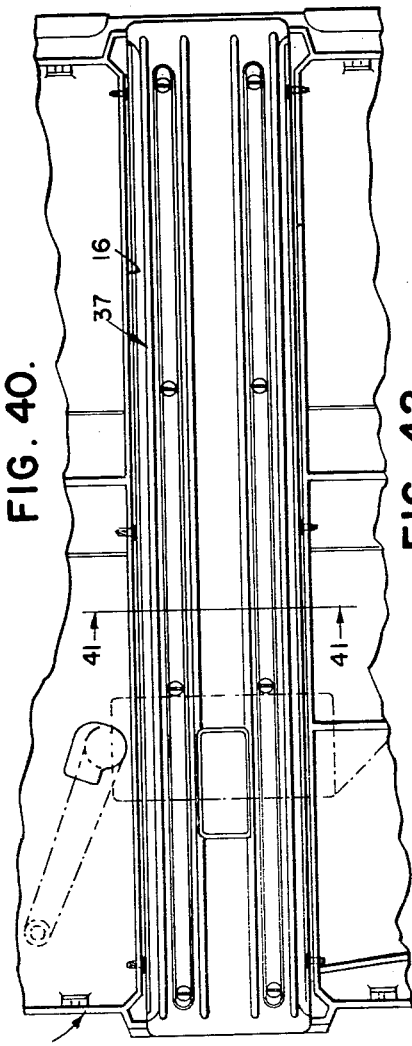
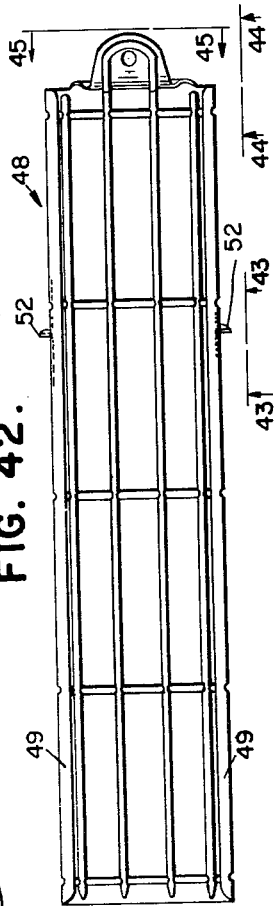
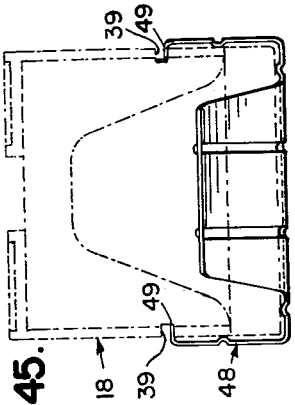
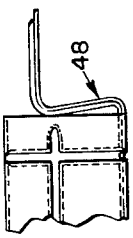
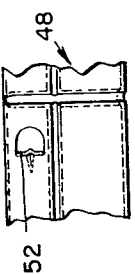
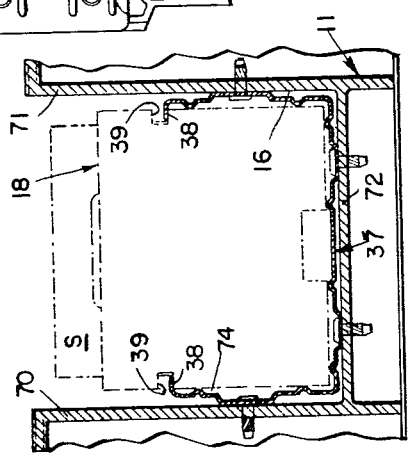
INVENTOR
LOUIS J. MISURACA
BY
*Frauch, Nolan & Neale*
ATTORNEYS Sept. 19, 1961  L. J. MISURACA  3,000,258
PHOTOGRAPHIC SLIDE PROJECTOR
Original Filed Sept. 29, 1954  17 Sheets-Sheet 14
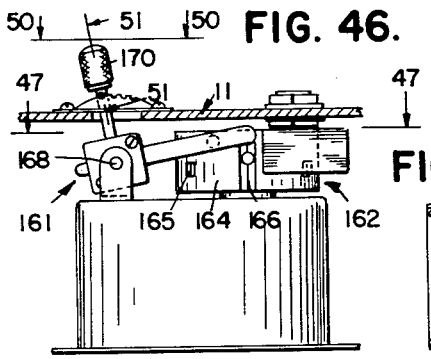
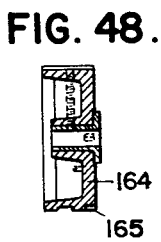
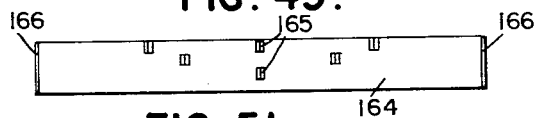
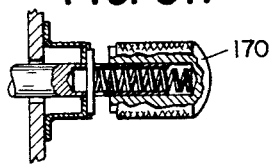
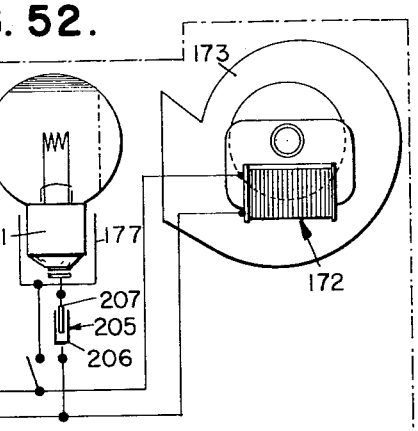
INVENTOR
LOUIS J. MISURACA
BY
ATTORNEYS Sept. 19, 1961 L. J. MISURACA 3,000,258
PHOTOGRAPHIC SLIDE PROJECTOR
Original Filed Sept. 29, 1954 17 Sheets-Sheet 15

INVENTOR
LOUIS J. MISURACA
BY

ATTORNEYS

INVENTOR
LOUIS J. MISURACA
BY
*Strauch, Nolan & Neale*
ATTORNEYS

Sept. 19, 1961 L. J. MISURACA 3,000,258
PHOTOGRAPHIC SLIDE PROJECTOR
Original Filed Sept. 29, 1954 17 Sheets-Sheet 17

INVENTOR
LOUIS J. MISURACA
BY
*Strauch, Nolan + Neale*
ATTORNEYS

United States Patent Office 3,000,258
Patented Sept. 19, 1961

3,000,258
PHOTOGRAPHIC SLIDE PROJECTOR
Louis J. Misuraca, Glendale, Calif., assignor, by mesne assignments, to Sylvania Electric Products Inc., Wilmington, Del., a corporation of Delaware
Original application Sept. 29, 1954, Ser. No. 459,147. Divided and this application Mar. 31, 1958, Ser. No. 725,047
8 Claims. (Cl. 88—28)

This invention has to do with photographic slide projectors, particularly those capable of completely automatic operation.

This is a division of my co-pending application Serial No. 459,147 filed September 29, 1954.

A disadvantage of most slide projectors is the fact that the slides are moved into the projecting area at room temperature in a cold or non-preheated condition with the result that when the film is heated in the projection light beam the various film components expand unequally, throwing the projected picture out of focus (known as "popping").

The major object of the invention is to provide novel means for effectively pre-heating and prepopping the photographic slides in a projector prior to projection.

It is another object of the present invention to provide, in a slide projector having means for indexing a slide magazine to bring the various slides into position to be fed to the exposure aperture, means for conveying hot air, as from the projection lamp area, to preheat the slides in the magazine before they reach that position.

A further and important object of the invention is to provide in a slide projector means for blowing air heated by the projection lamp into the slide magazine guide.

A further object of the invention is to provide a novel arrangement for prepopping 35 mm. photographic film color transparency slides mounted in an intermittently advanced magazine.

I submit that these and other objects will become apparent and substantiated from the drawings and the following description. Referring to the drawings:

FIGURE 5 is a sectional plan view on line 5—5 of FIGURES 1 and 9;

Figure 1:
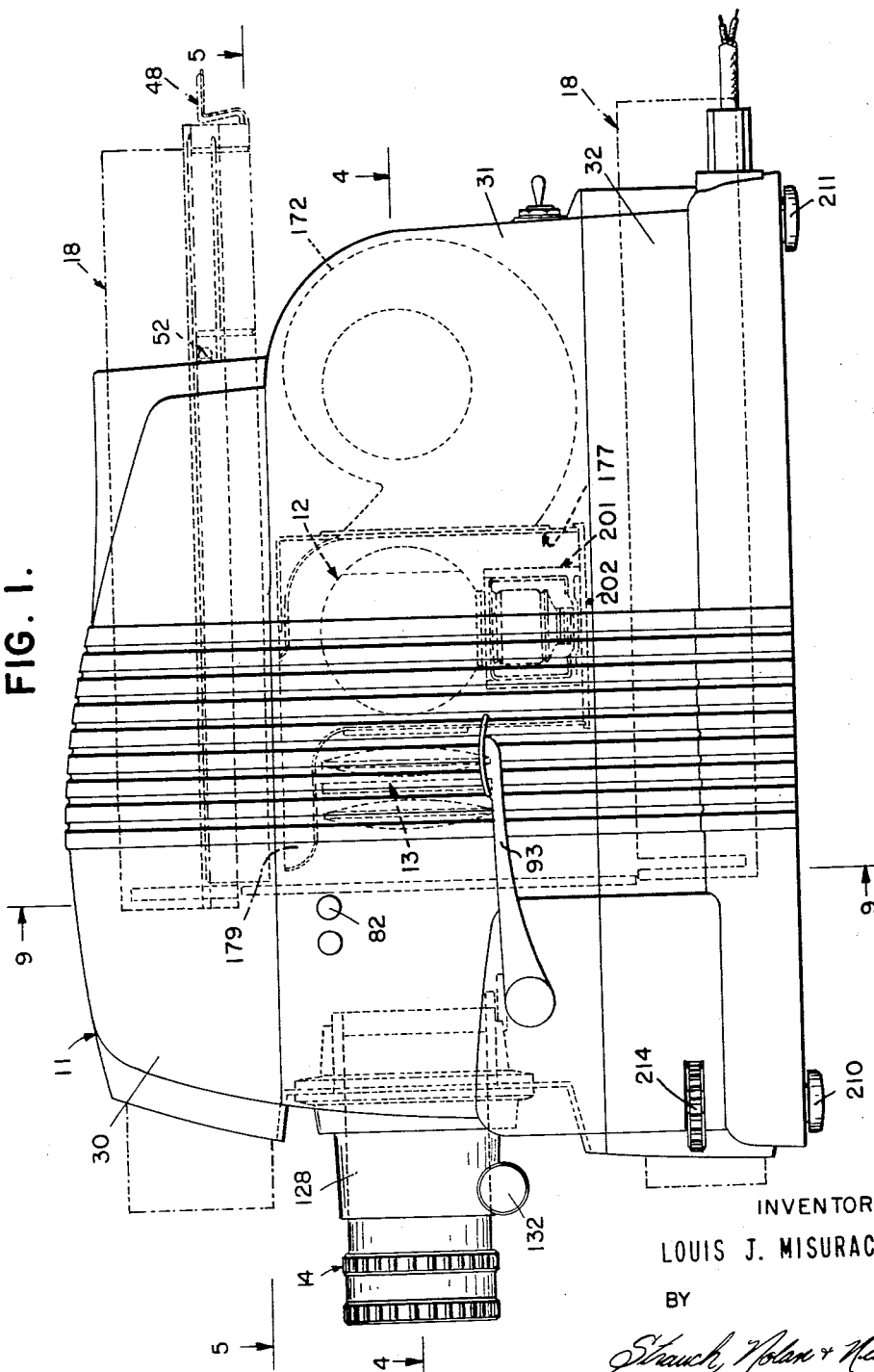
FIGURE 1 is a side elevational view of a projector embodying the invention.
Figure 2:
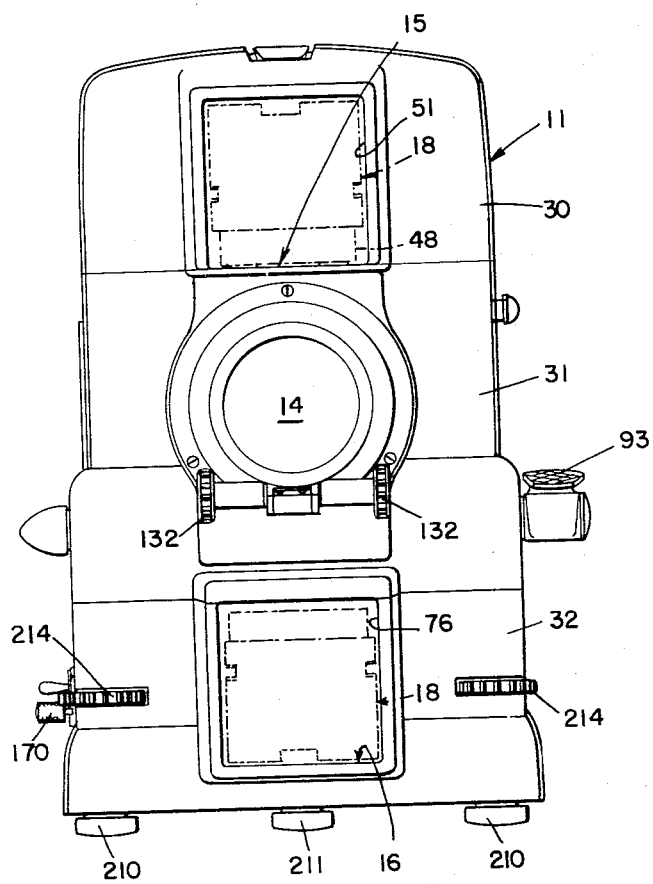
FIGURE 2 is a front elevational view of the device of FIGURE 1.
Figure 3:
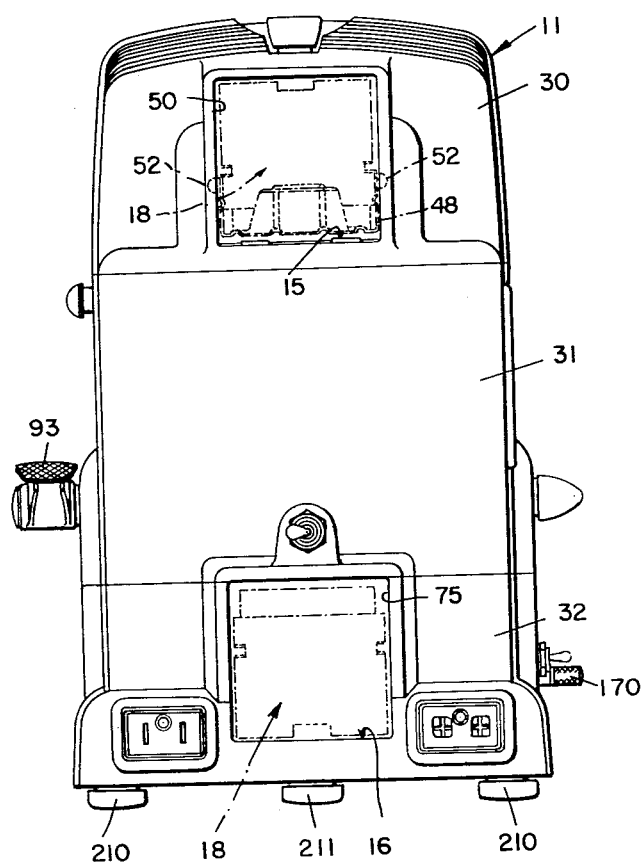
FIGURE 3 is a rear elevational view of the device of FIGURE 1.
Figure 4:
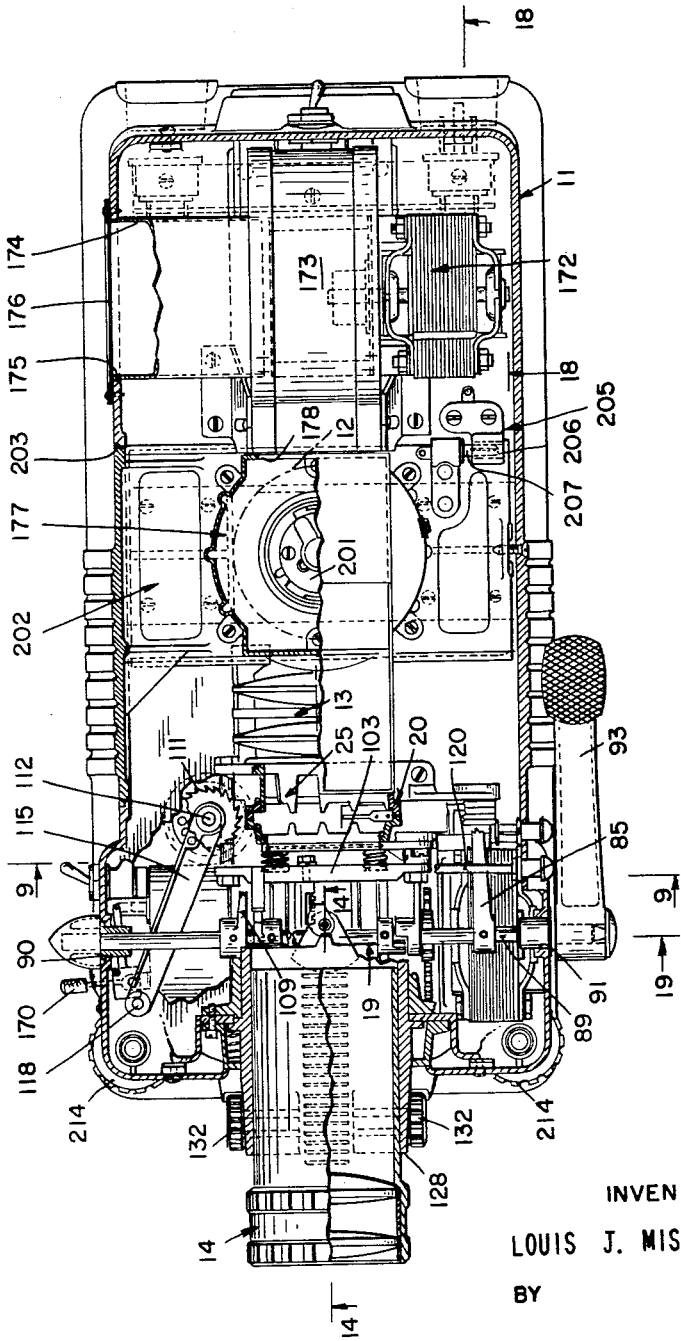
FIGURE 4 is a sectional plan view substantially along the plane of line 4—4 of FIGURES 1 and 9, but with parts broken away.
Figure 14:
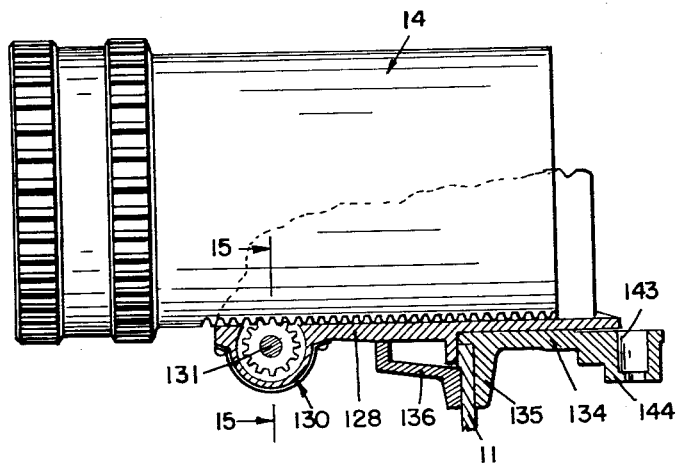
Figure 15:
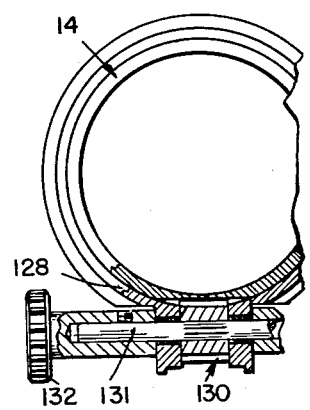
Figure 16:
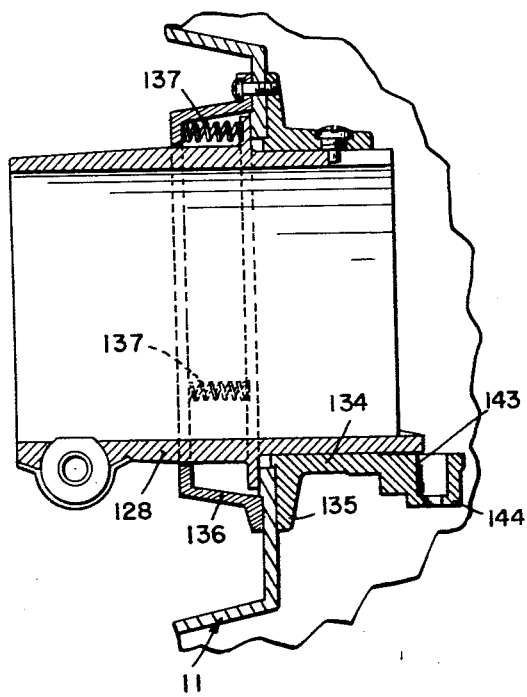
Figure 17:
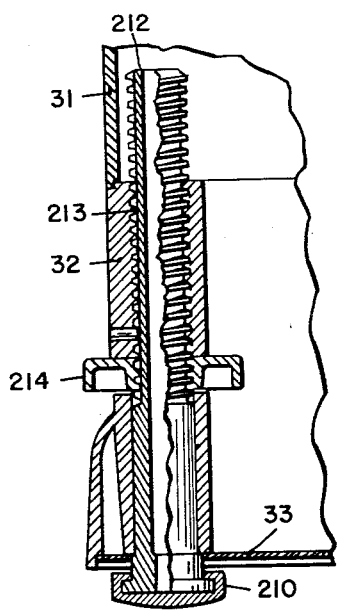
Figure 21:
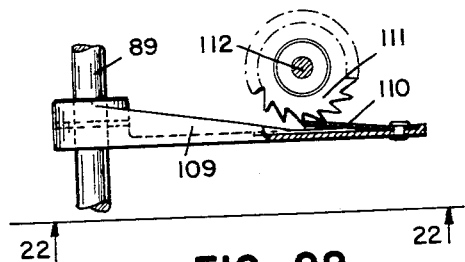
Figure 22:
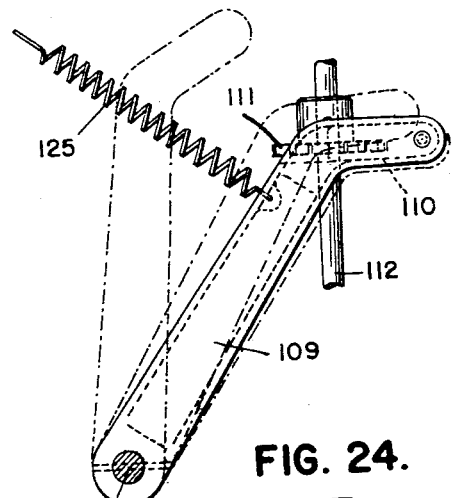
Figure 24:
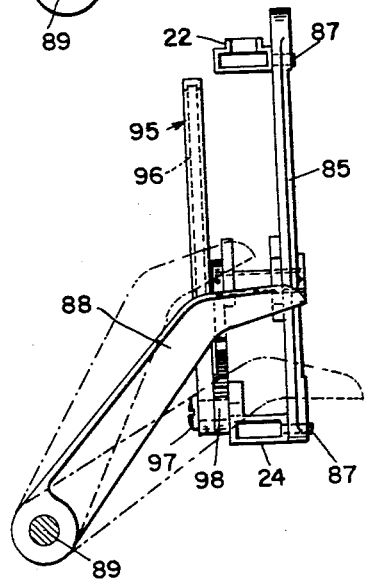
Figure 23:
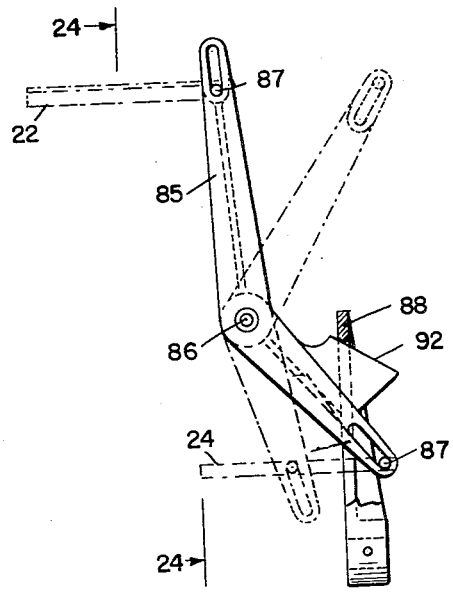
Figure 25:
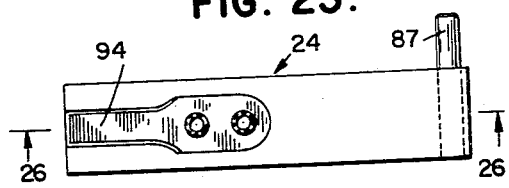
Figure 26:
Figure 27:
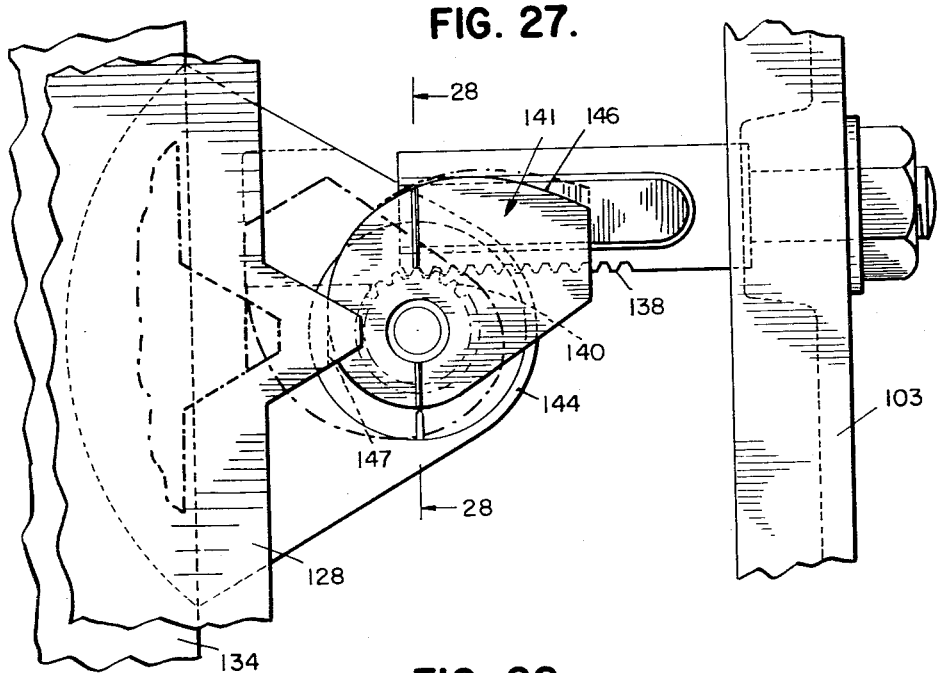
Figure 28:
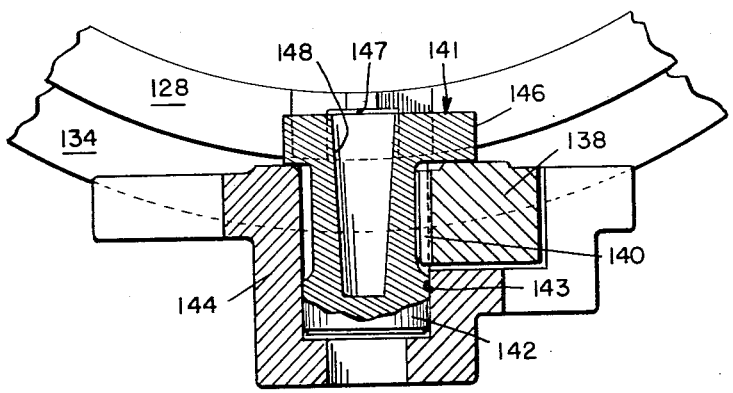
Figure 29:
Figure 30:
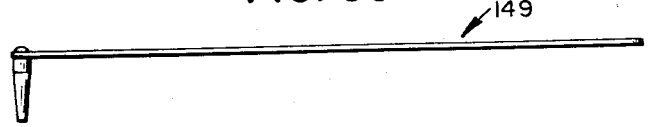
Figure 31:
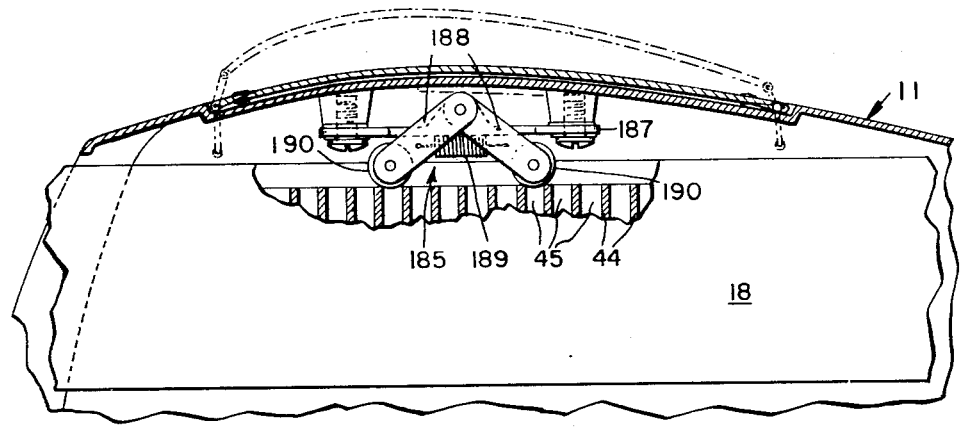
Figure 32:
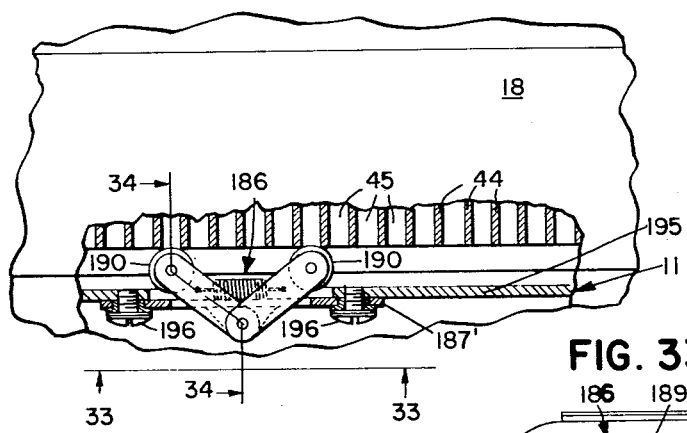
Figure 33:
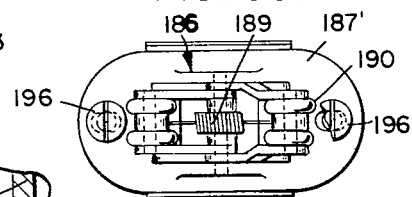
Figure 34:
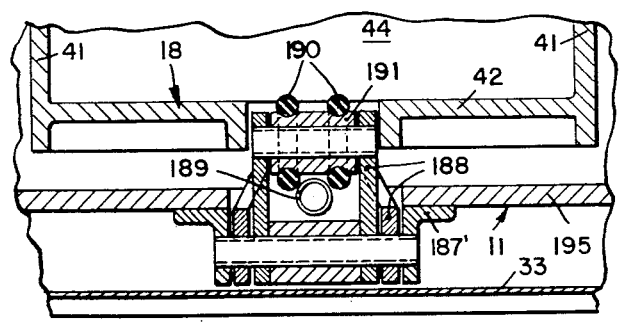
Figure 53A:
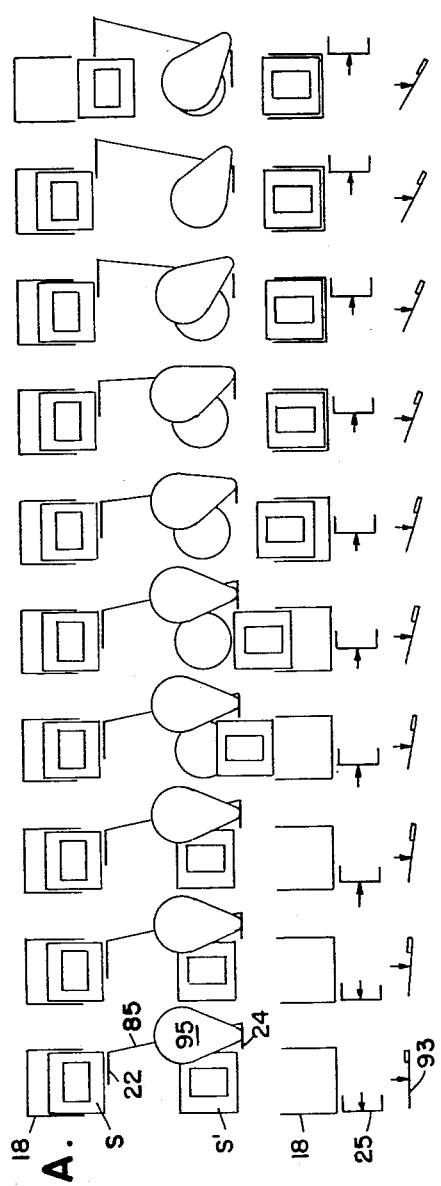
Figure 53B:
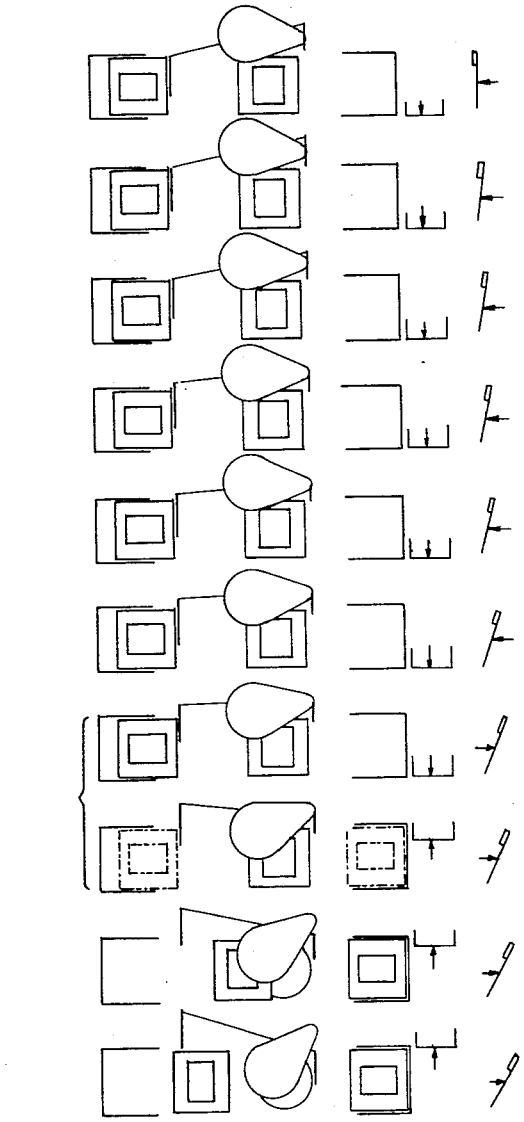
Figure 54:
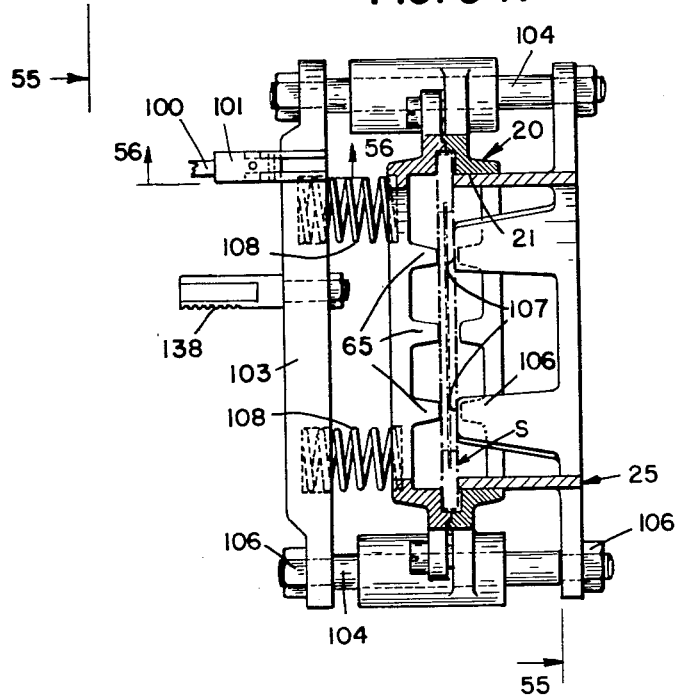
Figure 55:
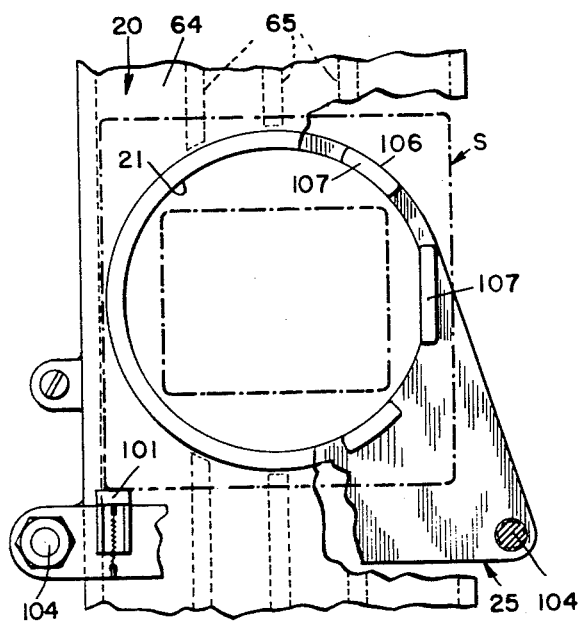
Figure 56:
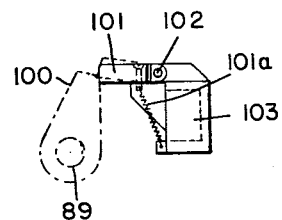

FIGURES 6, 7, and 8 are enlarged fragmentary sectional views on lines 6—6, 7—7, and 8—8, respectively, of FIGURE 5;

FIGURE 9 is a sectional elevational view in the plane of line 9—9 of FIGURES 1 and 4;

FIGURES 10, 11, and 12 are enlarged fragmentary sectional views on lines 10—10, 11—11, and 12—12, respectively, of FIGURE 9;

FIGURE 13 is an elevational view of the magazine advancing wheel assembly shown in FIGURE 12, as viewed from the plane 13—13 of FIGURE 12;

FIGURE 14 is an enlarged sectional view on line 14—14 of FIGURE 4;

FIGURE 15 is a fragmentary sectional view on line 15—15 of FIGURE 14;

FIGURE 16 is an enlarged sectional view of the forward lens mounting and appurtenances;

FIGURE 17 is an enlarged sectional view through a front adjustable leg;

FIGURE 18 is a fragmentary sectional view on line 18—18 of FIGURE 4, on a larger scale;

FIGURE 19 is an enlarged fragmentary sectional view on line 19—19 of FIGURE 4;

FIGURE 20 is a partial sectional view on line 20—20 of FIGURE 19;

FIGURE 21 is a fragmentary sectional plan view of the magazine advancing pawl and its associated ratchet wheel;

FIGURE 22 is a side elevational view of the parts shown in FIGURE 21 in the direction of the plane of line 22—22 of FIGURE 21;

FIGURE 23 is a front elevational view of the gate operating lever means;

FIGURE 24 is a view of parts shown in FIGURE 23 in the plane of line 24—24 of FIGURE 23;

FIGURE 25 is a plan view of the lower gate;

FIGURE 26 is a sectional view on line 26—26 of FIGURE 25;

FIGURE 27 is an enlarged fragmentary plan view of the rack and pinion connected between the slide holding means and the lens mounting;

FIGURE 28 is a sectional view on line 28—28 of FIGURE 27;

FIGURE 29 is a plan view of a tool for use in changing the focusing cam;

FIGURE 30 is a side elevational view of the tool of FIGURE 29;

FIGURE 31 is an enlarged fragmentary sectional elevational view of the upper portion of the casing showing a magazine engaging detent means;

FIGURE 32 is an enlarged fragmentary sectional elevational view of a detent means yieldably engaging the lower magazine;

FIGURE 33 is an inverted view of the mechanism of FIGURE 32 taken on line 33—33 thereof;

FIGURE 34 is an enlarged sectional view on line 34—34 of FIGURE 32;

FIGURE 35 is a plan view of a preferred form of slide magazine;

FIGURE 36 is an inverted plan view of the magazine of FIGURE 35;

FIGURE 37 is an enlarged sectional view on line 37—37 of FIGURE 35;

FIGURE 38 is an end elevational view as on line 38—38 of FIGURE 35;

FIGURE 39 is a partial side elevational view of the magazine of FIGURE 35 as indicated by line 39—39 thereof;

FIGURE 40 is an enlarged plan view of the lower magazine-receiving guideway;

FIGURE 41 is an enlarged sectional view on line 41—41 of FIGURE 40;

FIGURE 42 is a plan view of a magazine cover;

FIGURES 43 and 44 are fragmentary elevational views as indicated by lines 43—43 and 44—44, respectively, of FIGURE 42;

FIGURE 45 is an end elevational view as viewed from line 45—45 of FIGURE 42;

FIGURE 46 is a plan view of the timer mechanism shown mounted on the casing wall, the latter being in section;

FIGURE 47 is a view on line 47—47 of FIGURE 46;

FIGURE 48 is a sectional view on line 48—48 of FIGURE 47 of the timing drum;

FIGURE 49 is a view of the periphery of the timing drum as it would appear if in a single plane;

FIGURE 50 is a view on line 50—50 of FIGURE 46;

FIGURE 51 is an enlarged sectional view on line 51—51 of FIGURE 46;

FIGURE 52 is a schematic wiring diagram of the electrical elements and connections;

FIGURE 53a and FIGURE 53b are schematic views showing successive positions of the principal parts during one complete cycle of operation;

FIGURE 54 is a sectional plan view of the slide retaining means;

FIGURE 55 is a fragmentary sectional front elevational view on line 55—55 of FIGURE 54;

FIGURE 56 is a fragmentary sectional view on line 56—56 of FIGURE 54; and

Figure 57:
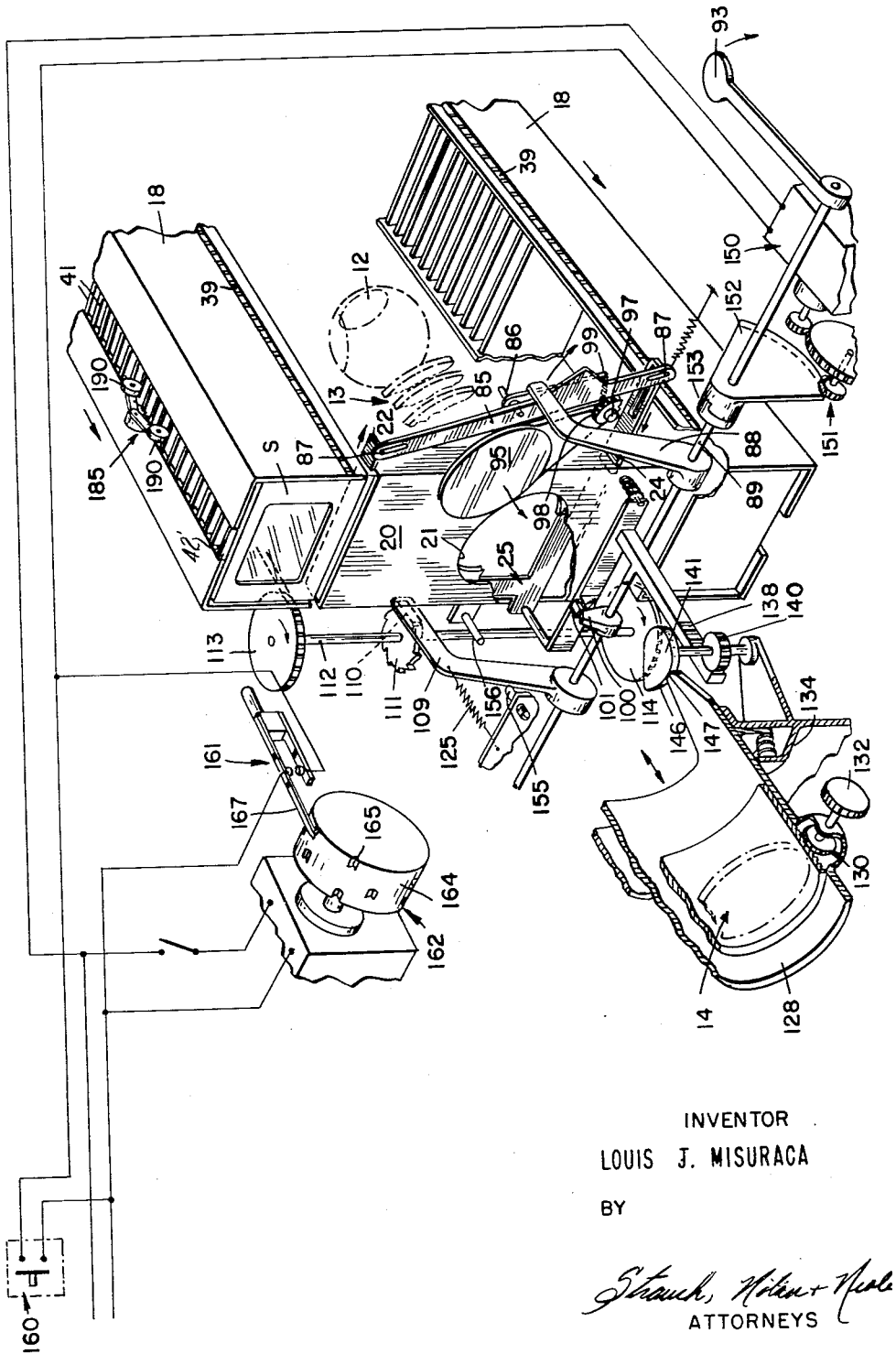

FIGURE 57 is a perspective view, largely diagrammatic, of the major components of the device.

More particularly describing the invention, in general the device illustrated comprises a casing 11 in which are mounted a projection lamp 12, rear lens and condenser assembly 13, and forward lens assembly or objective 14 arranged to provide a substantially horizontal optical axis. Above the optical axis there is provided an upper magazine guide 15 and below the axis a lower magazine guide 16. These are each parallel to the optical axis and are adapted to slidably receive slide magazines 18. An upright chute 20 extends from the floor of the upper magazine guide to the lower magazine guide directly across the optical axis or axis of projection, the chute being suitably apertured in the region 21 where a slide is positioned for projection.

Associated with the chute is a gate means which includes an upper gate 22 for controlling release of slides from the upper magazine into the chute and a lower gate 24 which serves to arrest the fall of the slides (designated S where shown) released in the chute and momentarily hold each slide in approximate position for projection. A slide retaining means or pressure plate 25 is mounted just above the lower gate and serves to grip and hold the slide after it has fallen on the lower gate in proper position for projection maintaining pressure toward the front after which the gates return to their normal position, shown in FIGURE 57.

Means are provided for operating the gates and subsequently advancing the two magazines step by step so that slides may be released one by one from the upper magazine and after being projected fall into corresponding spaces or pockets in the lower magazine.

The slide-gripping means is also combined with means for adjusting the forward lens 14 to correlate focus of the same and compensate for slide mounts of different thicknesses.

Additionally, a feature of the invention is the preheating of the slides in the upper magazine by means of forced air used to cool the lamp.

Referring now, in more detail, to the apparatus, the casing 11 is shown as comprising an upper section 30, a center section 31, a lower section 32, and a base plate 33.

The upper section is formed to provide depending parallel walls 35 and 36 which extend longitudinally of the device and these are fitted with an upper magazine-receiving guideway member 37 generally of inverted channel shape with marginal inwardly extending edge portions 38 for engaging longitudinal slots 39 in a slide magazine 18. I prefer to utilize partitioned magazines as best shown in FIGURES 35 to 39, the magazines having side walls 41, bottom wall sections 42, end walls 43, and a plurality of evenly spaced partitions 44 which extend transversely of the magazine and provide a plurality of slide-receiving pockets or spaces 45 each of which freely accepts a single slide of any conventional type. A longitudinal slot 42' is formed along bottom wall 42. Also, I prefer to have a longitudinal slot 39 in each side wall of the magazine exposing edges 44' of the partitions, the edges projecting somewhat outwardly of the plane of the inner surface of the side walls in semi-circular form (see FIGURE 12). A longitudinal slot 42' extends the length of bottom wall 42.

It may be assumed that a magazine, in which slides are normally stored, is filled with slides to be projected. For my purpose these slides are arranged in inverted position in the magazine, because the upper or supply magazine is placed in the projector in inverted position. The latter is accomplished by temporarily covering the magazine with a channel-shaped cover 48 (FIGURES 42–45) which has inwardly extending marginal flanges 49 for engagement with the slots 39 in the sides of the magazine. When so covered the magazine may be inverted and inserted into the upper magazine guide through the opening 50 at the rear of the casing. An opening 51 is provided at the forward end of the magazine guide. A projection 52 on the cover engages the casing of the projector and prevents entrance of the cover beyond the position in which it is shown in FIGURE 1. It is to be noted that in this position the magazine projects beyond the inner end of the cover by a distance equal to the width of a slide pocket. The cover may be removed at any time after the magazine has been advanced to a position such that the rearward end is within the upper magazine guide. However, so as not to prevent the circulation of air by the blower, as will be explained later, the cover should be withdrawn about a third of its distance. This permits slides in the forward portion of the magazine to drop onto and rest upon tracks 53 which may be of micarta or the like. These are mounted on an apertured plate 54 secured by screws 55 to portions 56 of walls 35 and 36. A second plate 57 is secured to portions 58 of walls 35' and 36' by screws 59, the second plate lying in the same plane as plate 54. The second plate also carries track members 53' which are the same as tracks 53.

The two plates 54 and 57 are spaced apart at 61 and thus provide an interrupted floor from end to end of the device. The space 61 lies directly over and in registration with chute 20. The latter is vertically disposed and comprises an enclosing wall 64 provided with internally projecting ribs 65. The chute is provided with the aforementioned double aperture 21 coincident with the optical axis. The lower end of the chute terminates at the lower magazine guide 16.

The lower magazine guide 16 includes the upright walls 70 and 71 and connecting wall 72 which may be formed integral with the lower section of the casing. Inside these walls there is mounted a channel-shaped guideway member 74 which receives the lower and originally empty magazine as shown in FIGURES 9 and 41. The lower section of the casing is provided with an opening 75 at the rear and an opening 76 at the front to give access to the lower magazine guide.

When the magazines are first inserted they are moved to positions such that the first slide pocket of the upper magazine registers with space 61 and the chute 20 and the lower magazine is one pocket space rearwardly of the upper magazine. Proper positioning of the magazines when initially inserted is accomplished by the provision of normally retracted stop pins 78 and 79 which extend into the upper and lower magazine guides respectively and are actuated against their springs 80 to extend to a position to act as stops by means of the axially movable knob 82 connected to a pin actuating member 83 which has its ends received in slots in the ends of the two pins, as best shown in FIGURE 9. The pins are laterally offset from front to rear of the device to accomplish the aforementioned positioning of the magazines.

The gate means for controlling the descent of the slides in the chute includes the upper gate 22 mounted slidably in a gate guide means 84 for movement longitudinally of itself at the upper end of the chute upon which the slide next to be projected rests. Below the axis of projection and the openings 21 in the chute is the lower gate 24 which is normally retracted or open. The gates are connected for operation by lever 85 pivoted upon a fixed pin 86. A pin and slot connection means 87 is used between each end of the lever and the respective gates.

The lever 85 is actuated by an arm 88 mounted upon a shaft 89 journalled in the casing at 90 and 91, the arm engaging a cam surface 92 on the lever. Shaft 89 is provided with a handle 93 for optional manual operation and when the handle is depressed the lever is pivoted as shown in FIGURE 23 to reverse the position of the gates. When this occurs, the slide resting on the upper gate falls to the lower gate. The latter may be provided with a leaf spring 94 to cushion the fall of the slide.

The shaft 89, whether motor-driven or operated by hand, rotates about 30° clockwise (as viewed in FIGURE 57) and then returns to its original position by turning in the opposite direction under the influence of spring return means later to be described.

A shutter 95 having a translucent disk 96 of suitable glass is pivotally mounted at 97 and carries a gear sector 98 in engagement with a sector 99 fixed to lever 85. Thus the shutter operates with relation to the lever.

As previously indicated, I provide a slide retaining means or pressure plate 25, and this is also actuated by shaft 89. The latter carries a cam 100 engaging a hinged projection 101 pivoted at 102 on bar 103 connecting the forward ends of reciprocable shafts 104. The latter are carried in bearings 105 secured at the sides of the chute. The pressure plate is mounted at the rearward ends of these shafts and the parts are secured by nuts 106 at the ends of the shafts. The pressure plate has forwardly extending projections 106 with flat forward surfaces 107 for engagement with the frame or mount portion of a slide. Compression springs 108 are interposed between the bar 103 and the chute for yieldably urging the pressure plate forward to slide-engaging position.

The projection 101 is urged to the position in which it is shown in full lines by a tension spring 101a. As shaft 89 rotates clockwise, cam 100 forces the pressure plate rearwardly until the cam deflects the projection 101 upwardly permitting the pressure plate to spring forward. Since the projection 101 is hinged, the cam may pass the projection upon return movement of the shaft 89.

I also utilize the shaft 89 for advancing the slide magazines, and this is accomplished by means of a ratchet arm 109 on the shaft which carries a ratchet finger 110 for engagement with a ratchet wheel 111 upon return movement of the shaft. The ratchet wheel is fixed to a rotatively mounted shaft 112 which carries upper and lower magazine-engaging gear wheels 113 and 114 respectively which fit partially into the slots 39 in the sides of the upper and lower magazines for engagement with the partitions thereof.

The shaft 112 is journalled in brackets 115 and 116 mounted on a shaft 118. The latter is journalled in the casing as best shown in FIGURE 9. The assembly is yieldably urged by spring 119 in a direction such that the magazine-engaging wheels 113 normally cooperate with the magazines. However, the knob 82, when pushed in, operates a rod 120 axially which is connected to bracket 115 at 121 to swing the magazine-engaging wheels to a disengaged position. The wheels 113, 114 are also each provided with means to insure proper feeding and location of the magazines and this is shown as comprising a spring-pressed detent 122 for engagement with recesses 123 in the wheel.

For the purpose of returning shaft 89 to its normal or original position, I provide a tension spring 125 connected to ratchet arm 109 at one end and to any suitable fixed portion of the projector forwardly thereof at the other end.

A particular feature of my invention is the provision of means for automatically adjusting the objective or lens to compensate for photographic slides of different total thicknesses. The forward lens group or objective 14 is mounted for manual adjustment in a sleeve 128 by means of a rack and pinion connection 130 between a shaft 131 and the sleeve, the shaft having knurled knobs 132 at each end in the usual manner. However, the sleeve 128 is slidably mounted in a collar 134 secured to the casing by a flanged portion 135 as best shown in FIGURE 16. The sleeve has an external flange received within a spring-retaining housing member 136 and compression spring 137 are interposed between this and the flange so that the sleeve is normally biased rearwardly to the position in which it is shown in FIGURE 16. For the purpose of adjusting the sleeve axially to position it in accordance with the thickness of a particular slide (assuming that the objective has first been properly adjusted for a slide or given thickness), a rack 138 is provided on the bar 103 forming part of the pressure plate assembly. The rack engages a pinion portion 140 of a cam member 141 having shank 142 rotatably received in a counterbore 143 formed in an extension 144 at the inner end of the collar 134. Member 141 has a cam section 146 at its upper end for engagement with the rear surface 147 of the sleeve 128. The cam is formed to the proper curve so that it will proportionately adjust the sleeve and hence the forward objective in absolute predetermined relation to the movement of the pressure plate. The amount of such movement is controlled by the thickness of the slide mount engaged by the plate. Thus, as the pressure plate moves forwardly and grips a slide member, the rack and pinion and cam connection between the pressure plate and the sleeve holding the objective serve to proportionately correctly move the objective to compensate for any difference in thickness of the slides which may be brought into projecting position. The movement of the front element is usually not in a straight-line variation but rather of logarithmic change.

For convenience in replacing the focusing cam as may be required for extreme differences of projection distances, the cam member has a taper socket 148 for reception of a tool 149 (FIGURES 29, 30) and is removable through the bore normally occupied by the front lens barrel.

While I have shown and described means for manually operating the mechanism, I contemplate that the device be motor-operated and timed to operate automatically or at the will of an operator. Thus, I provide a motor 150 which is connected by gearing 151 (FIGURES 19 and 20) to a gear sector 152 which is rotatively mounted on shaft 89. A clutch 153 serves to transmit movement of the sector to the shaft but permits required rotation of the shaft independently of the sector in manual operation.

The motor operates to rotate shaft 89 through about 30° of rotation in a clockwise direction as viewed in FIGURE 57. The return movement of said shaft is brought about by the spring 125. Rotation of the shaft is limited by the stops 155 and 156 against which ratchet arm 109 abuts. Referring to FIGURES 52 and 57, the motor circuit includes a manually operable switch 160 and an automatic timer-controlled switch 161, the latter being for the purpose of completely automatic operation of the device. It is a feature of my invention that any one of several different time cycles of projection can be selected, that is, the device set for automatic operation to project each slide for any one of several given time periods. This is accomplished by the timer 162 which includes a drum 164 which may be of molded plastic provided with a plurality of rows of recesses 165 therein, the recesses in each row being equally spaced from each other but differently spaced than those of the other rows. A common recess 166 extends across the face of the drum. The switch includes a finger 167 which rides on the periphery of the drum and the parts are so disposed that when the finger engages a recess the switch closes.

The switch is pivotally mounted at 168 and carries a handle 170 as shown in FIGURES 46, 50, and 51 to permit of the adjustable positioning of the finger of the switch over a selected row of the recesses. With an output speed of 2 r.p.m. the timer motor gives cycles of 7.5, 10, 15 and 30 seconds duration. Slower or faster cycles may be substituted as required.

Another feature of the invention is the pre-heating of the slides before they are projected, particularly those not mounted between glass. Referring now to FIGURES 1, 4, 5, and 18, I provide a motor-driven blower 172, the blower portion 173 which has wall means 174 providing an intake passage thereto through an opening 175 in the side of the casing (FIGURE 4). The opening may be covered with an unimpeding screen of metal fabric 176 or the like. The air stream of the blower passes into the lamp housing 177 at the rear through opening 178 and out through the upper portion 179 of the lamp housing (FIGURE 1) to the under side of the forward portion of the apertured plate 54 forming part of the upper magazine guide. This portion of the plate has central apertures 180 and lateral apertures 181 through which the heated air can pass to enter the magazine guide to pre-heat the slides of the magazine therein. Some of this hot air passes through the magazine and exits through slot 42'. The guideway in the guide provides ample space around the magazine for the escape of the hot air to the exterior of the casing through the opening at each end of the guide. Thus the slides in the forward portion of the upper magazine are thoroughly pre-heated prior to projection and those mounted in original paper mounts will "pop" previous to actual projection.

Another feature of the device is the provision of detent means 185 in the upper portion of the casing, and similar means 186 in the lower portion, for engagement with the partitions of the magazines therein. The detent means 185 comprises a bracket 187 secured to the casing and a pair of pivotally mounted double arms 188 which are biased toward each other by tension spring 189. The arms carry rollers at their ends shown as comprising a pair of resilient O-ring-like tires 190 mounted upon appropriately grooved wheels 191. The detents engage the magazine partitions as best shown in FIGURE 31.

The detent means 186 is similar to the means 185, being mounted on a bracket 187' (identical to 187) secured to the lower plate portion 195 of the casing by screws 196. The lower detent means is so located that the forward wheel engages the magazine directly below the chute, thereby permitting the resilient tires to cushion and silence the fall of the slide as it drops into the pocket in the lower magazine.

Referring to FIGURES 4 and 52, another feature of the invention is the mounting of the base 201 of the lamp 12, the lamp housing 177, and the rear lens assembly 13 upon a slidably mounted plate 202 attached to and extending inwardly of an access plate 203 in the center section of the casing. With this arrangement the lamp and associated parts may be readily removed from the projector to replace the lamp. As a safety feature I include an electrical connection 205 in the lamp circuit. This includes female portion 206 fixedly mounted in the casing and male portion 207 carried on the plate 202. When plate 202 is fully inserted the parts are in electrically conductive relation; however, as the plate is moved outwardly of the casing the connection is broken.

For the purpose of leveling the device as a whole, I provide three legs, two at the front, designated 210, and one at the rear, designated 211. The two front legs are made adjustable, and referring to FIGURE 17, these are shown as including threaded tubular members 212 received in bores 213 provided in the casing. Each member 212 has an adjustment nut 214 thereon.

In the operation of the device an empty magazine 18 is placed in the lower magazine guide. This may be of a distinctive color as it is intended that it should remain with the projector. A full magazine is placed in the upper magazine guide, after first being sealed with the cover 48 and then inverted. The slides are originally placed in the magazine with their images upright so that when the magazine is subsequently inverted the slides will be inverted as required for projection. As previously pointed out, the cover is partially withdrawn to allow for circulation of air from the blower. The magazines are correctly positioned with respect to the chute by pushing them forward until they strike the stop pins 78 and 79, respectively, which are brought into play by manual operation of the knob 82.

Whether the operation is motor-driven or manual, as the shaft 89 is rotated clockwise (FIGURE 57), the pressure plate 25 is first cammed rearwardly. The gates subsequently are moved to reverse their positions, that is, the upper gate opens and the lower gate closes. In this connection it may be pointed out that the sequence of the operation of the gates, shutter, slide movement and pressure plate operation is shown diagrammatically in FIGURES 53a and 53b. When the gates reverse their position the slide which has been resting on the upper gate 22 falls from the upper magazine onto the lower gate 24 where it is held temporarily thereby. It will be apparent that had there already been a slide in the projecting position, this would have dropped when released by the rearward movement of the pressure plate. While the slide is held on the lower gate and at approximately the end of the clockwise movement of the shaft the pressure plate is released by cam 100 and consequently springs forward to engage the slide on the lower gate and maintain it in projecting position. The forward movement of the pressure plate adjusts the forward objective in accordance with the thickness of the slide. Subsequent return movement of the shaft 89 returns the gates to their normal or original position and reopens the shutter 95 which had previously been moved into position over the optical axis. The return movement of the shaft operates the ratchet means 109, 110, 111 to turn shaft 112 having the magazine advancing wheels 113 thereon, thereby advancing the magazines one space, readying them for another cycle of operation.

It will be apparent that the projector can be operated either automatically upon any of the given optional time cycles determined by the setting of the switch 161 on the timer or that it can be operated partially automatically by manual operation of switch 160 or that it can be operated manually by depressing the handle on shaft 89. In the completely automatic operation, when the timer 162 is used, it may be pointed out that, since it is only necessary to rotate shaft 89 through about 30° of rotation with the motor 150, the switch 161 remains closed sufficiently long when in one of the recesses of the timer drum to accomplish this. The motor 150 may be of the shaded pole type to prevent injury thereto when the shaft 89 reaches the end of its rotative movement, stopping the motor, although current may still be flowing through the motor.

As previously indicated, it is useful to maintain a distinctively colored magazine for use as the lower or slide-receiving magazine. By so doing, when a complete magazine full of slides has been projected the two magazines are removed from the projector and the upper magazine can then be placed over the lower magazine, and the two magazines held together and inverted to return the slides to the original magazine in correct position for projection at a future time.

While the device shown is primarily designed for the projection of conventional 35 mm. slides, it may be readily adapted to receive less common slides, such as those measuring 2¼" x 2¼" and those measuring 2¼" x 3¼", for example. Also, the various features of the invention may be incorporated in a projector for three-dimension or stereo slides.

I claim:
1. In combination, a photographic film slide projector, a slide containing magazine mounted on said projector, means on the projector defining a projection aperture, slide handling means for withdrawing a slide from a magazine compartment and moving the slide to projection position at said aperture, and slide preheating means in said projector for directing heat onto at least the fore- most slide in said magazine yet to be projected for preheating said slide prior to withdrawing it for projection.

2. In a photographic film slide projector having a casing, a lamp in the casing, means for forcing air past the lamp to heat said air, and means defining a projection aperture for receiving light from said lamp, means for pre-heating slides to be projected comprising means defining a slide magazine-receiving space in the casing having an opening to the exterior of the casing, means defining a slide transfer passage between said space and said projection aperture, and means directing and admitting air heated by said lamp into said space adjacent said slide transfer passage for direct preheating contact with a slide for slides in said space adjacent said slide transfer passage.

3. In a photographic film slide projector, a support, a projection lamp on said support, slide positioning means in the path of projection light, a slide magazine movably mounted on said support, means for shifting slides from said magazine to said positioning means, and means for forcing hot air from said lamp through said magazine to prepop slides slides prior to their being shifted from said magazine.

4. In a photographic film slide projector, a support, a projection lamp on said support, a slide magazine guide structure on said support for slidably mounting a slide magazine, means defining a throat through which a slide extracted from the magazine moves toward a projection position in the path of light from said lamp, means for indexing said magazine to position it for delivery of successive slides to said throat, and means for directing hot air from the lamp into said guide structure to preheat and prepop slides adjacent said throat prior to extraction from said magazine.

5. In a photographic film slide projector, a projection lamp, a guide structure, a slide magazine movably mounted in said structure, means for indexing said magazine along said structure, means defining a throat through which a slide to be projected is moved into the path of light from the lamp, means defining an opening in a wall of said structure, said magazine having an apertured wall adapted to traverse said opening as the magazine moves along said guide structure and said opening being located to be traversed by a group of slides in the magazine just prior to reaching said throat, and means for forcing air heated by said projection lamp through said opening and said magazine for prepopping slides in said magazine.

6. In the slide projector defined in claim 5, said last means comprising a blower connected by a passage to a lamp chamber surrounding the lamp and a passage conducting hot lamp air from said chamber to said opening.

7. A photographic film slide projector comprising a guide structure for slidably mounting a slide magazine, and means for extracting slides in succession from a magazine in said guide structure and positioning them in a projection light path, means in the projector providing a source of hot air, and means for forcing hot air from said source into said guide structure at a sufficiently high temperature to prepop at least the group of slides in said magazine adjacent said extracting means.

8. In a slide projector, the combination of a housing, a light source in the housing, lens means aligned with the source for projecting an image of a film held in projection position, lens means positioned on said housing for transmitting light rays from the light source, a magazine for holding in spaced relation a plurality of films to be projected, said magazine being slidably disposed within a tunnel positioned adjacent a wall of the housing and the projection position, means for forcing air into the housing where a portion thereof is heated, said wall having an opening formed therethrough effecting communication between the housing and tunnel adjacent the films in the magazine which are adjacent the projection position, means for directing the flow of a portion of heated air through the opening to produce buckling of the films adjacent the projection position, and means for seriately moving the buckled films into projection position whereby a film will remain in buckled condition during projection so that the focus of the image projected from the film will be constant.

References Cited in the file of this patent

UNITED STATES PATENTS

| | | |
|---|---|---|
| 2,038,784 | Ghadiali | Apr. 28, 1936 |
| 2,294,219 | Woermann | Aug. 25, 1942 |
| 2,627,017 | Howard | Jan. 27, 1953 |